United States Patent
Dormoy

(10) Patent No.: US 11,701,936 B1
(45) Date of Patent: Jul. 18, 2023

(54) VEHICLE WITH SUPPORT ASSEMBLY FOR SUSPENSION ARM

(71) Applicant: BOMBARDIER RECREATIONAL PRODUCTS INC., Valcourt (CA)

(72) Inventor: Maxime Dormoy, St-Denis-de-Brompton (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/707,197

(22) Filed: Mar. 29, 2022

(51) Int. Cl.
*B60G 7/00* (2006.01)
*B60G 17/005* (2006.01)
*B62D 55/07* (2006.01)
*B62D 55/108* (2006.01)
*B62M 27/02* (2006.01)
*B60G 7/02* (2006.01)
*B62D 55/18* (2006.01)

(52) U.S. Cl.
CPC ............. *B60G 7/001* (2013.01); *B60G 7/02* (2013.01); *B60G 17/005* (2013.01); *B62D 55/07* (2013.01); *B62D 55/1083* (2013.01); *B62D 55/18* (2013.01); *B62M 27/02* (2013.01); *B60G 2300/322* (2013.01); *B62M 2027/026* (2013.01)

(58) Field of Classification Search
CPC ...................................................... B60G 7/001
See application file for complete search history.

(56) References Cited

U.S. PATENT DOCUMENTS

| | | | |
|---|---|---|---|
| 11,235,634 B2 * | 2/2022 | Lavallee | B62M 27/02 |
| 11,458,795 B1 * | 10/2022 | Gagnon | B62D 55/07 |
| 2022/0305857 A1 * | 9/2022 | Owens | B60G 7/04 |
| 2022/0305860 A1 * | 9/2022 | Theobald | B60G 7/02 |
| 2023/0049333 A1 * | 2/2023 | Prusak | B62M 27/02 |

\* cited by examiner

*Primary Examiner* — Paul N Dickson
*Assistant Examiner* — Shams Dhanani
(74) *Attorney, Agent, or Firm* — BCF LLP

(57) ABSTRACT

A vehicle including a chassis; a seat; a motor; an endless drive track; a suspension assembly supporting the endless drive track. The suspension assembly includes at least one slide rail and at least one suspension arm pivotally connected to the slide rail and the chassis, the arm including a top bar extending laterally and a shock absorber. A first support assembly connecting a first end portion to a first chassis side and a second support assembly connecting a second end portion to a second chassis side. Each support assembly includes a bracket connected to the chassis at a top portion of the bracket; and a connector disposed on an end portion of the top bar, the connector including an arm portion, the end portion extending through a connector passage, and a flange portion defining a slot therein, a bottom portion of the bracket being received in the slot.

20 Claims, 8 Drawing Sheets

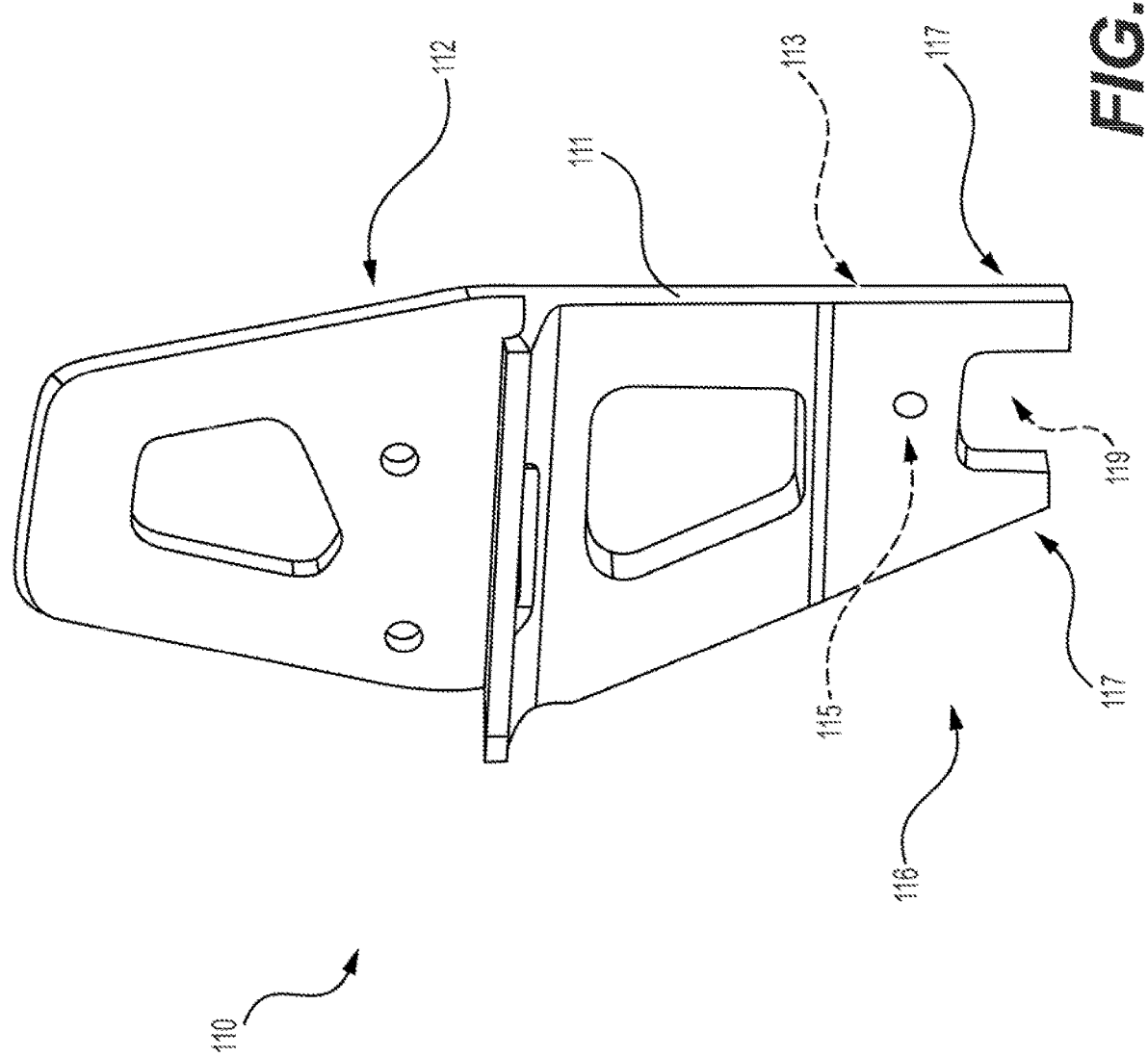

VEHICLE WITH SUPPORT ASSEMBLY FOR SUSPENSION ARM

FIELD OF TECHNOLOGY

The present technology relates generally to vehicles with endless tracks, and more specifically vehicles with support assemblies for suspension arms.

BACKGROUND

Recreational vehicles, such as snowmobiles, are often provided with endless tracks for travel on a variety of surfaces and terrains, rough and smooth, soft and rigid, level, and inclined upwards or inclined downwards. Assemblies for supporting the endless tracks often include slide rails in sliding contact with an interior surface of the endless track and one or more suspension arms connecting the slide rails to the chassis or tunnel.

As the endless track and the suspension assembly compresses, extends, and pivots over terrain, rear suspension arms pivot at their connection point with the chassis or tunnel. Over time, these connections can wear and may be costly or complicated to replace or repair.

Therefore, there is a desire for solutions for pivotally connecting suspension arms to a vehicle chassis.

SUMMARY

It is an object of the present technology to ameliorate at least some of the inconveniences present in the prior art.

In according to aspects of the present technology, there is provided support assemblies for pivotally connecting a rear suspension arm to the tunnel of a snowmobile. For a rear suspension arm with a laterally extending top bar, each end portion of the top bar is received in a corresponding support assembly which in turn pivotally connects to the tunnel. Each assembly includes a bracket connected to the tunnel and a connector disposed on the top bar. The connector is formed from a durable, light friction material, such as a thermoplastic. The top bar is loosely received in a passage through the connector, such that the top bar can pivot or rotate within the connector. Flanges extending from the connector receive a lower portion of the bracket therebetween to link the bracket and the connector. The bracket and connector are further fastened together. In some embodiments, there is also c-clip and a metal plate disposed on an outward side of the connector and around the top bar. The clip aids in maintaining the laterally position of the connector on the top bar. As the connector is rotationally fixed while the clip rotates with the top arm, friction between the connector and clip could cause wear on the connector. The plate, formed from metal and fastened to the connector, acts as a buffer between the connector and the clip. In a situation where the connector breaks, the plate could also aid in maintaining the suspension arm in place.

In according to one aspect of the present technology, there is provided a vehicle including a chassis; at least one seat connected to the chassis; a motor connected to the chassis; an endless drive track disposed at least in part below the chassis, the endless drive track being operatively connected to the motor for propulsion of the vehicle; a suspension assembly supporting the endless drive track. The suspension assembly includes at least one slide rail, at least one suspension arm pivotally connected to the at least one slide rail and pivotally connected to the chassis, the at least one suspension arm including a top bar extending laterally at least partially under the chassis, and a shock absorber connected between the chassis and the at least one slide rail. Also included are a first support assembly connecting a first end portion of the top bar of the at least one suspension arm to a first side of the chassis; and a second support assembly connecting a second end portion of the top bar of the at least one suspension arm to a second side of the chassis, the second end portion being disposed laterally opposite the first end portion, each of the first support assembly and the second support assembly including a bracket connected to the chassis at a top portion of the bracket; and a connector disposed on a corresponding one of the first end portion of the top bar and the second end portion of the top bar, the connector including: an arm portion with a connector passage defined therein, the corresponding one of the first end portion and the second end portion extending through the connector passage, and a flange portion extending from the arm portion, the flange portion defining a slot therein, a bottom portion of the bracket being received in the slot of the flange portion of the connector.

In some embodiments, for each of the first support assembly and the second support assembly, the bottom portion of the bracket extends at least partially around the arm portion of the connector.

In some embodiments, each of the first support assembly and the second support assembly further includes a clip connected to the corresponding one of the first end portion and the second end portion, the clip being disposed outward of the connector.

In some embodiments, for each of the first support assembly and the second support assembly, the clip is a c-clip.

In some embodiments, each of the first support assembly and the second support assembly further includes a plate disposed between the connector and the clip, the plate being connected to the connector.

In some embodiments, each of the first support assembly and the second support assembly further includes a plate connected to the connector.

In some embodiments, for each of the first support assembly and the second support assembly, the plate is fastened to the connector.

In some embodiments, for each of the first support assembly and the second support assembly, the plate is further fastened to the bracket.

In some embodiments, each of the first support assembly and the second support assembly further includes a fastener connecting the plate to the connector and the bracket.

In some embodiments, for each of the first support assembly and the second support assembly, the plate includes a plate body, and a plate passage defined in the plate body; and the plate is disposed around the corresponding one of the first end portion and the second end portion such that the top bar extends through the plate passage.

In some embodiments, the plate is fastened to the connector and the bracket; and the plate is arranged such that a gap is formed between the plate passage and the top bar such that the plate and the at least one suspension arm are not in direct contact.

In some embodiments, for each of the first support assembly and the second support assembly: the connector is formed from a thermoplastic material; and the plate is formed from metal.

In some embodiments, for each of the first support assembly and the second support assembly: the bracket includes a bracket body; the bracket body forms an undercut on at least one lateral side of the bracket body; and at least one side of the flange portion is pressed into the undercut when the connector is fastened to the bracket.

In some embodiments, for each of the first support assembly and the second support assembly, the undercut of the bracket body is arranged such that the bracket bears forces on the support assembly from downward movement of the at least one suspension arm relative to the chassis.

In some embodiments, each of the first support assembly and the second support assembly further comprises a plate fastened to the connector by a fastener extending through the plate and the connector; and for each of the first support assembly and the second support assembly: the top bar extends through a portion of the plate, and the undercut of the bracket body is arranged such that the bracket bears forces on the support assembly from downward movement of the at least one suspension arm relative to the chassis prior to the plate and the fastener bearing said forces.

In some embodiments, for each of the first support assembly and the second support assembly, the arm portion of the connector and the flange portion of the connector are integrally connected.

In some embodiments, the chassis includes a tunnel, the rear suspension assembly being connected the tunnel.

In some embodiments, the vehicle is a snowmobile; and the snowmobile further includes a front right ski connected to a front right portion of the chassis; and a front left ski connected to a front left portion of the chassis.

In according to another aspect of the present technology, there is provided a suspension system for supporting an endless drive train, the system including a suspension assembly including at least one slide rail; at least one suspension arm pivotally connected to the at least one slide rail and configured to be pivotally connected to a chassis of a vehicle, the at least one suspension arm including a laterally extending top bar of the at least one suspension arm; and a shock absorber connected to the at least one slide rail and configured to be connected to the chassis; and at least one support assembly for connecting an end portion of the top bar of the at least one suspension arm to the chassis, the support assembly including a bracket configured for connecting to the chassis at a top portion of the bracket; and a connector disposed on the end portion of the top bar, the connector including: an arm portion with a connector passage defined therethrough, the end portion extending through the connector passage, and a flange portion extending from the arm portion, the flange portion defining a slot therein, a bottom portion of the bracket being received in the slot of the flange portion of the connector.

In some embodiments, the support assembly further includes a clip connected to the end portion, the clip being disposed outward of the connector.

In some embodiments, the support assembly further includes a plate disposed between the connector and the clip, the plate being connected to the connector. In some embodiments, the clip is a c-clip.

In some embodiments, the support assembly further includes a plate connected to the connector. In some embodiments, the plate is fastened to the connector. In some embodiments, the plate is further fastened to the bracket.

In some embodiments, the plate includes a plate body, and a plate passage defined in the plate body; and the plate is disposed around the end portion such that the top bar extends through the plate passage.

In some embodiments, the bottom portion of the bracket extends at least partially around the arm portion of the connector.

In some embodiments, the arm portion of the connector and the flange portion of the connector are integrally connected.

For purposes of the present application, terms related to spatial orientation when referring to the vehicle and components in relation to the vehicle, such as "forward", "rearward", "left", "right", "above" and "below", are as they would be understood by a user of the vehicle sitting thereon in a normal riding position, with the vehicle in a straight ahead orientation (i.e. not steered left or right), and in an upright position (i.e. not tilted). When referring to a component alone, terms related to spatial orientation are described with respect to the component as disposed on the vehicle.

The explanations provided above regarding the above terms take precedence over explanations of these terms that may be found in any one of the documents incorporated herein by reference.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7 is a rear, left side perspective view of a bracket of the left support assembly of the snowmobile of FIG. 1;

Figures may not be drawn to scale.

DETAILED DESCRIPTION

Although the present technology is described below mainly with respect to a snowmobile 10, it is contemplated that aspects could be applied to other vehicles with suspension arms supporting an endless track, including, but not limited to all-terrain vehicles (ATVs) and side-by-side vehicles (SSVs).

Figure 1:
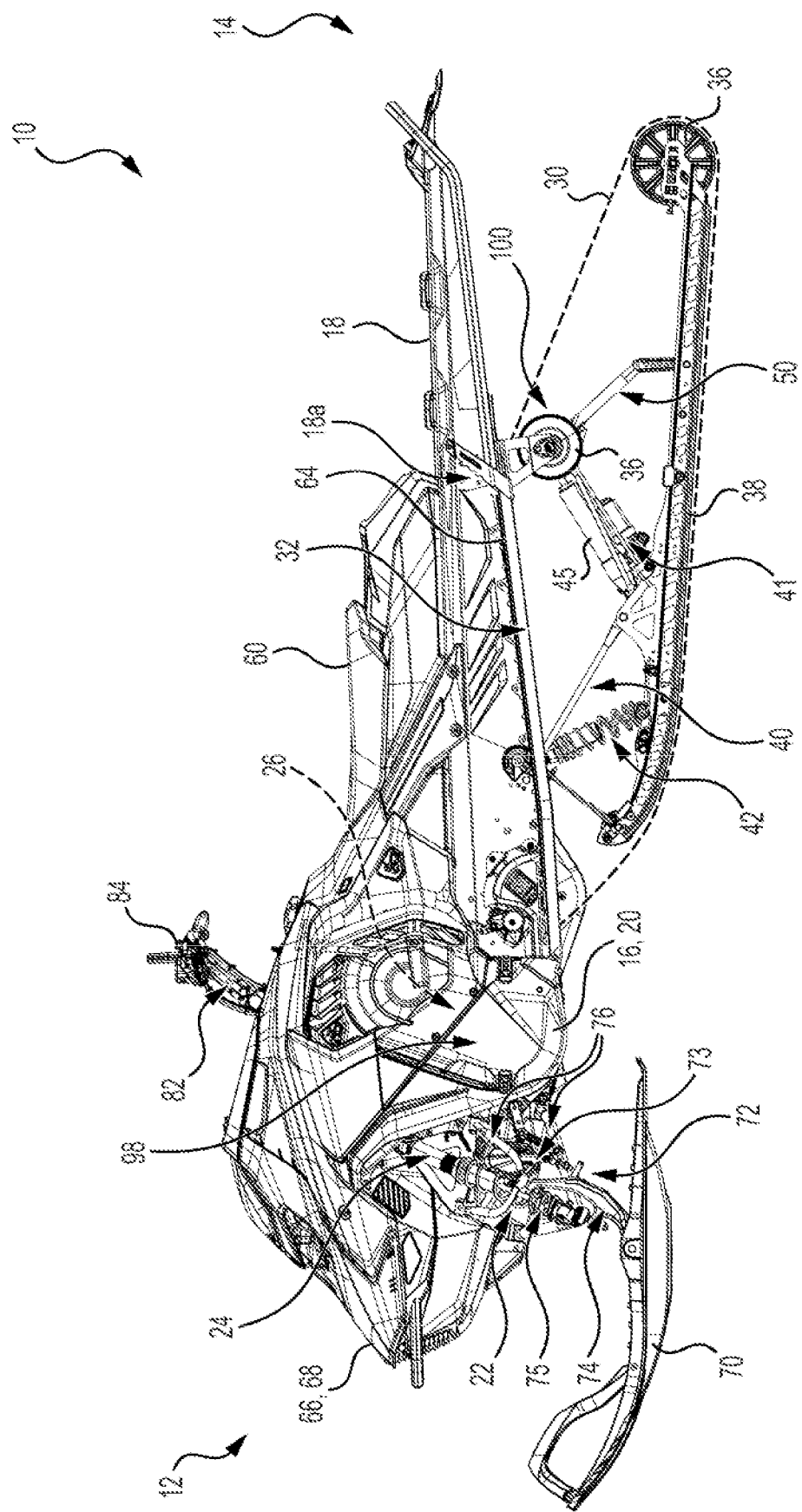
FIG. 1 is a left side elevation view of a snowmobile according to a non-limiting embodiment of the present technology.

With reference to FIG. 1, the snowmobile 10 includes a front end 12 and a rear end 14 which are defined consistently with a travel direction of the vehicle 10. The snowmobile 10 includes a vehicle body in the form of a frame or chassis 16 which includes a rear tunnel 18, a motor module 20, a front suspension module 22 and an upper structure 24. The tunnel 18 is formed from sheet metal parts assembled to form an inverted U-shape when viewed from the front or rear end 12, 14. The inverted U-shaped tunnel 18 has a left side portion 18a and a right side portion 18a (only the left being shown).

A motor 26, schematically illustrated, is carried in a motor compartment defined by the motor module 20 of the chassis 16 and provides, in part, propulsion of the snowmobile 10. In the illustrated embodiment, the motor 26 is an internal combustion engine 26, but it is contemplated that it could be, for example, an electric motor or a hybrid.

An endless drive track 30 (shown schematically) is positioned generally under the tunnel 18 and is operatively connected to the motor 26 via a drivetrain including a belt transmission system (not shown). The endless drive track 30 is driven to run about a rear suspension assembly 32 connected to the chassis 16 for propulsion of the snowmobile 10.

Figure 2:
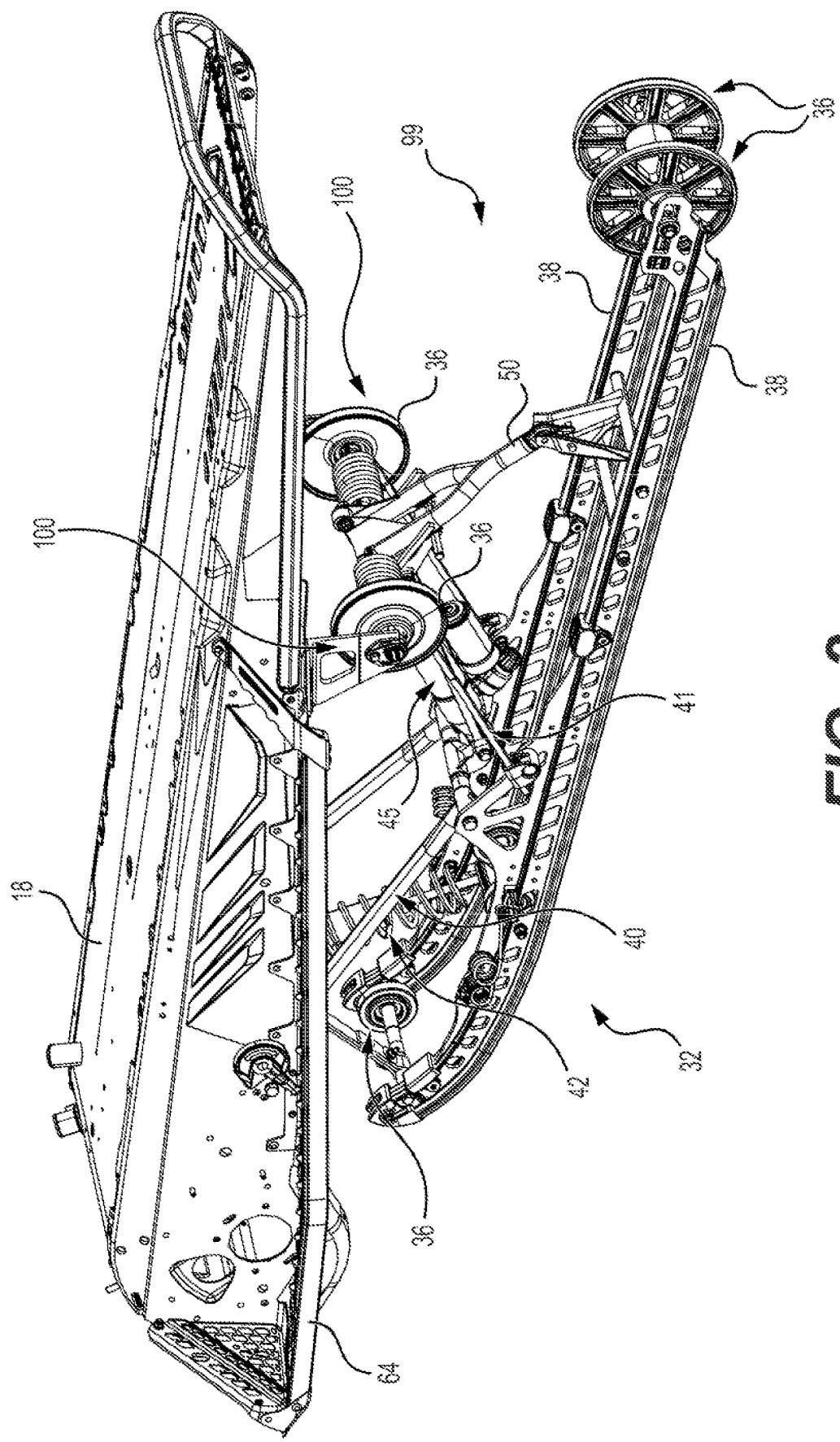
FIG. 2 is a top, rear, left side perspective view of portions of a chassis, two support assemblies, and a rear suspension assembly of the snowmobile of FIG. 1.

With additional reference to FIG. 2, the rear suspension assembly 32 includes multiple idler wheels 36 (five being clearly illustrated) and a pair of slide rails 38 in sliding contact with the endless drive track 30. The slide rails 38 are attached to the tunnel 18 by a front suspension arm 40 and a rear suspension arm 50. A front shock absorber assembly 42 and a rear shock absorber 45 with adjacent torsion springs 41 bias the slide rails 38 away from the tunnel 18. The rear suspension arm 50 is described in more detail below.

The tunnel 18 is supported by the front and rear suspension arms 40, 50. The pivoting of the suspension arms 40, 50 changes the relative angle and vertical separation between the slide rails 38 and the tunnel 18 to enable a transfer of weight to the front end 12 or the rear end 14 of the snowmobile 10 as would be appropriate for the travel speed and terrain, for example, during travel on inclined surfaces. The pivoting of the suspension arms 40, 50 also aids in bump absorption as the snowmobile 10 travels over uneven or rough terrain. It is contemplated that the snowmobile 10 could be provided with a different embodiment of a rear suspension assembly 32 than the one shown herein.

Returning to FIG. 1, a straddle seat 60 is positioned atop the chassis 16. The seat 60 is adapted to accommodate the user of the snowmobile 10. The seat 60 can also be configured to accommodate a passenger. A footrest 64 is positioned on each side of the snowmobile 10 below the seat 60 to accommodate the user's feet, see also FIG. 2. Each of the left and right footrests 64 extends generally laterally outwardly from the corresponding left- and right-side portion of the tunnel 18. In the illustrated embodiment, each side portion 18a of the tunnel 18 is bent laterally outwardly at its bottom edge to form the corresponding footrest 64. It is however contemplated that the footrest 64 could be formed separately from and mounted to the tunnel 18.

At the front end 12 of the snowmobile 10, body panels 66 enclose the motor 26 and other components of the powerpack such as a transmission or air intake system. The body panels 66 include a hood 68 which can be removed/opened to allow access to the motor 26 and other internal components of the snowmobile 10 from the top and the front which may be required, for example, for inspection or maintenance of the motor 26 and/or the powerpack. The body panels 66 also include two side panels 98 extending along the left and right sides of the snowmobile 10. The side panels 98 are both removably connected to the chassis 16 and/or to other body panels 66 and can be removed/opened to access the internal components from the corresponding lateral side.

Two skis 70 positioned at the forward end 12 of the snowmobile 10 are attached to the front suspension module 22 of the chassis 16 through a front suspension assembly 72. The front suspension module 22 is connected to the front end of the engine module 20. The front suspension assembly 72 includes ski legs 74, shock absorbers 75, supporting arms 76 and ball joints (not separately identified) for operatively connecting to the respective ski leg 74 and supporting arms 76.

A steering assembly 80 is provided generally forward of the seat 60. The steering assembly 80 includes a steering column 82 and a handlebar 84. The steering column 82 is rotatably connected to the chassis 16. The lower end of the steering column 82 is connected to the ski legs 74 via steering rods 73. The handlebar 84 is attached to the upper end of the steering column 82. The handlebar 84 is positioned in front of the seat 60. The handlebar 84 is used to rotate the steering column 82, and thereby the skis 70, in order to steer the vehicle 10.

The snowmobile 10 includes other components such as a display cluster, a windshield, an exhaust system, an air intake system, and the like. As it is believed that these components would be readily recognized by one of ordinary skill in the art, further explanation and description of these components will not be provided herein. Additional details pertaining to a snowmobile similar to the snowmobile 10 can be found in U.S. Pat. No. 11,235,634, issued Feb. 1, 2022, the entirety of which is incorporated herein by reference.

With additional reference to FIGS. 3 to 6, the snowmobile 10 according to the present technology includes two support assemblies 100 for pivotally connecting the rear suspension arm 50 to the tunnel 18. The two support assemblies 100 together with the rear suspension assembly 32 form a suspension system 99 for supporting the endless track 30 of the snowmobile 10.

The support assemblies 100 provide a pivoting connection between a top end of the rear suspension arm 50 and the tunnel 18. Each assembly 100 has relatively few parts providing the connection between the arm 50 and the tunnel 18, specifically a bracket 110 connected to the tunnel 18 and a connector 120 connected to the arm 50 being the main components. Compared to previously known manners of pivotally connecting the arm 50 to the tunnel 18, the present technology is thus generally lighter, lower in cost, and as will be seen below, requires no lubricant to be supplied.

Figure 3:
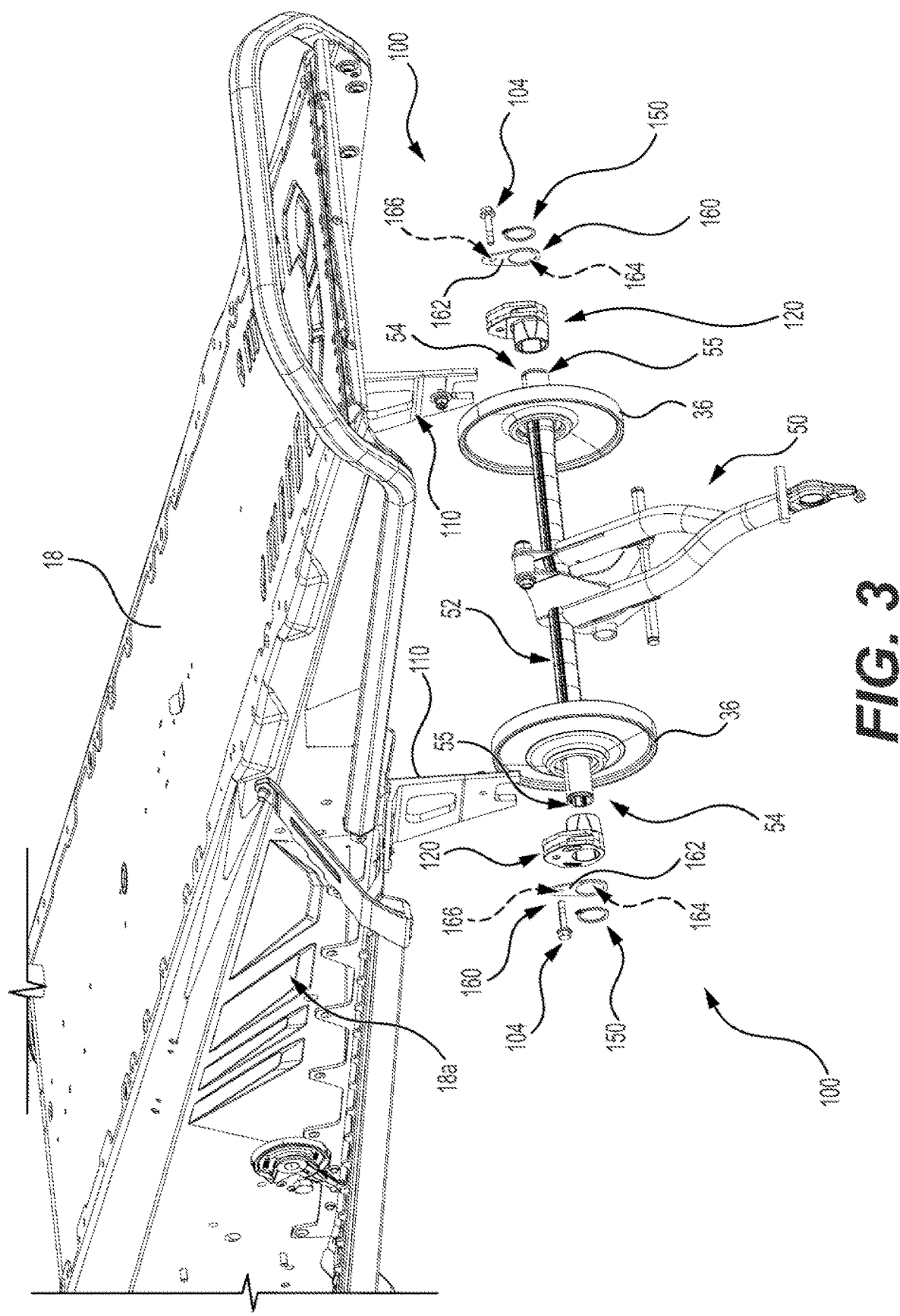
FIG. 3 is a close-up, exploded view of portions of the chassis, the two support assemblies, and a rear suspension arm of the rear suspension assembly of FIG. 2.
Figure 4:
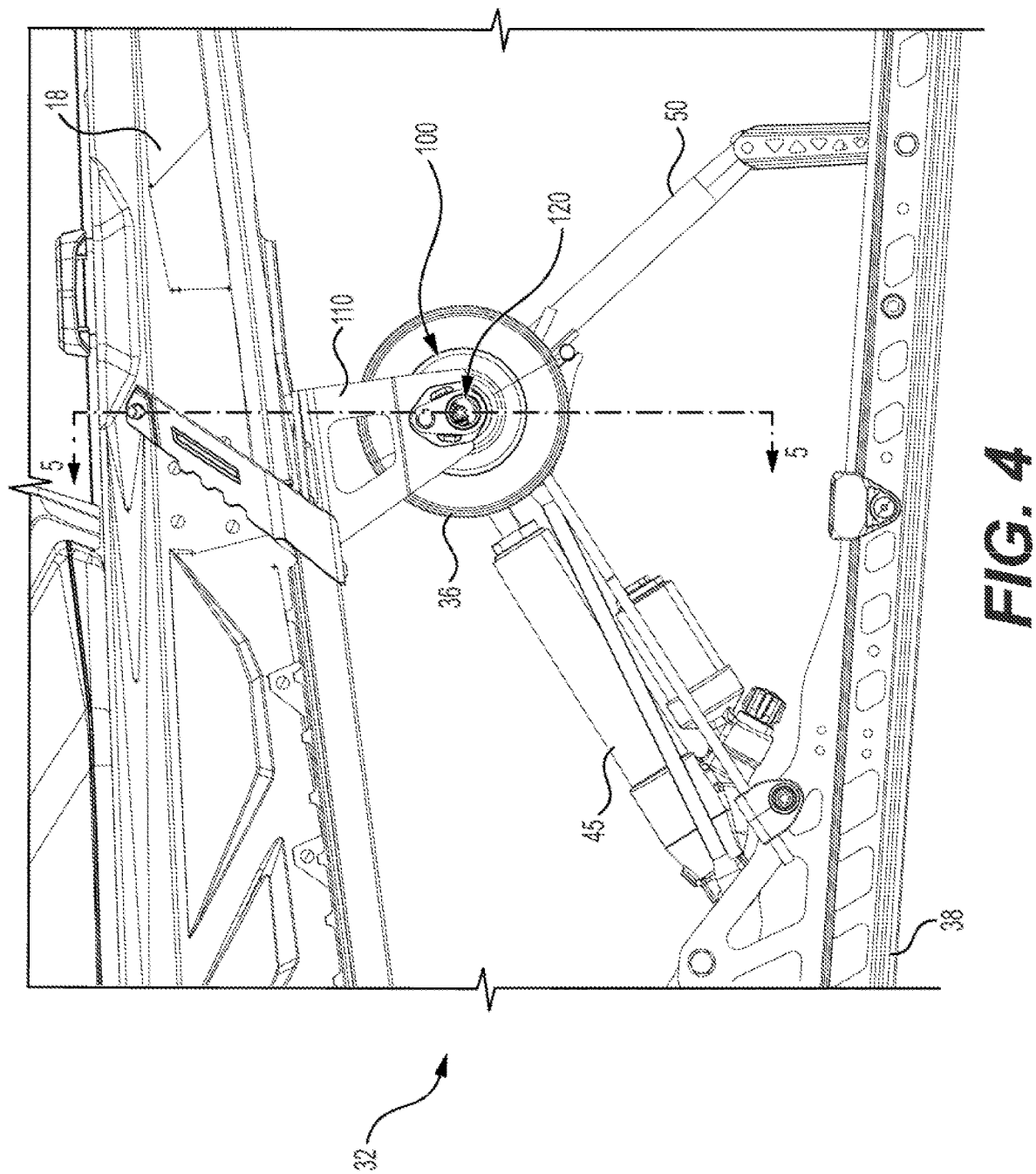
FIG. 4 is a left side elevation view of portions of the chassis, the rear suspension assembly and the two support assemblies of the snowmobile of FIG. 1.

As can be seen in FIG. 3, the rear suspension arm 50 includes a top bar 52 extending laterally (left to right) under the tunnel 18. The two support assemblies 100 connected to laterally opposite end portions 54 of the top bar 52. Specifically, a left support assembly 100 is pivotally connected to a left end portion 54 of the top bar 52 and a right support assembly 100 is pivotally connected a right end portion 54 of the top bar 52.

The left support assembly 100 and the right support assembly 100 are mirror images of each other; only the left support assembly 100 will be described in detail, also referred to below as the assembly 100. It is contemplated that the left and right support assemblies 100 could have additional differences in some embodiments. It is also contemplated that the two support assemblies 100 could be identical.

The assembly 100 includes a bracket 110 having a bracket body 111 connected to the chassis 16, further illustrated in isolation in FIG. 7. Specifically, the bracket 110 is connected to the tunnel 18 at an upper portion 112 of the bracket body 111. The bracket body 111 includes a lower portion 116 for linking with the connector 120. The lower portion 116 has two downward extending members 117. A recess 119 is defined between the members 117; arrangement of the members 117 and the recess 119 as installed on the snowmobile 10 is described in detail below. The bracket 110 also includes a through-hole 115 for receiving a fastener 104 through the bracket body 111. In at least some embodiments, the assembly 100 further includes the fastener 104 for connecting components of the assembly 100. In the illustrated embodiment, the fastener 104 is a bolt 104 with a washer 106 and a nut 108, although different fasteners could be used. Use and arrangement of the fastener 104 is described in more detail below.

Figure 6:
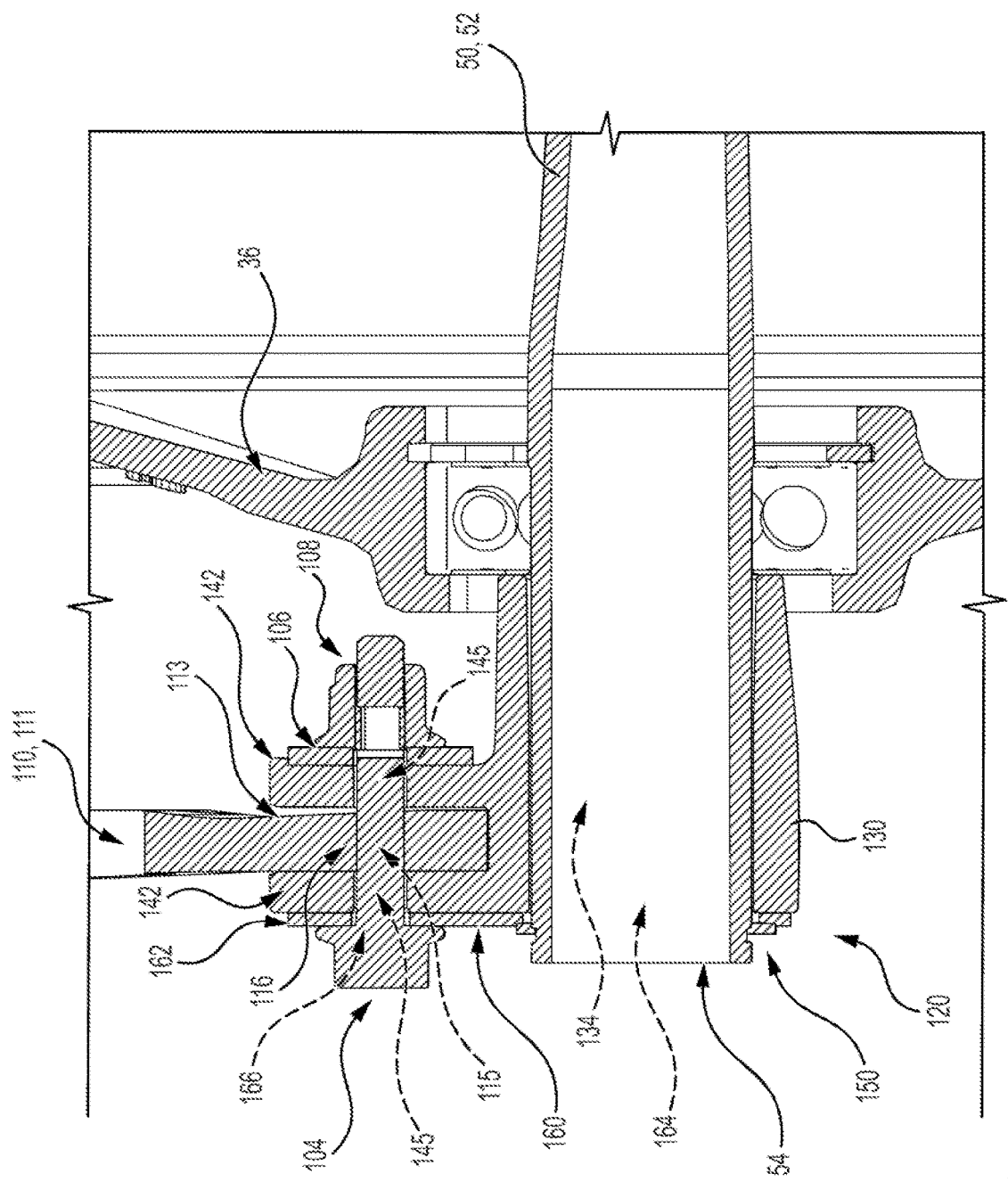
FIG. 6 is a close-up view of a left support assembly of the two support assemblies and an end portion of the rear suspension arm of the cross-sectional view of FIG. 5, taken from section 6 of FIG. 5.

As can best be seen in FIG. 6, the bracket body 111 forms an undercut 113 on one of the lateral sides of the bracket body 111. In the present embodiment, the undercut 113 is formed on an interior side of the bracket body 111, i.e. on the left side of the bracket 110 of the right support assembly 100 and on the right side of the bracket 110 of the left support assembly 100. Arrangement and use of the undercut 113 is described further below.

Figure 5:
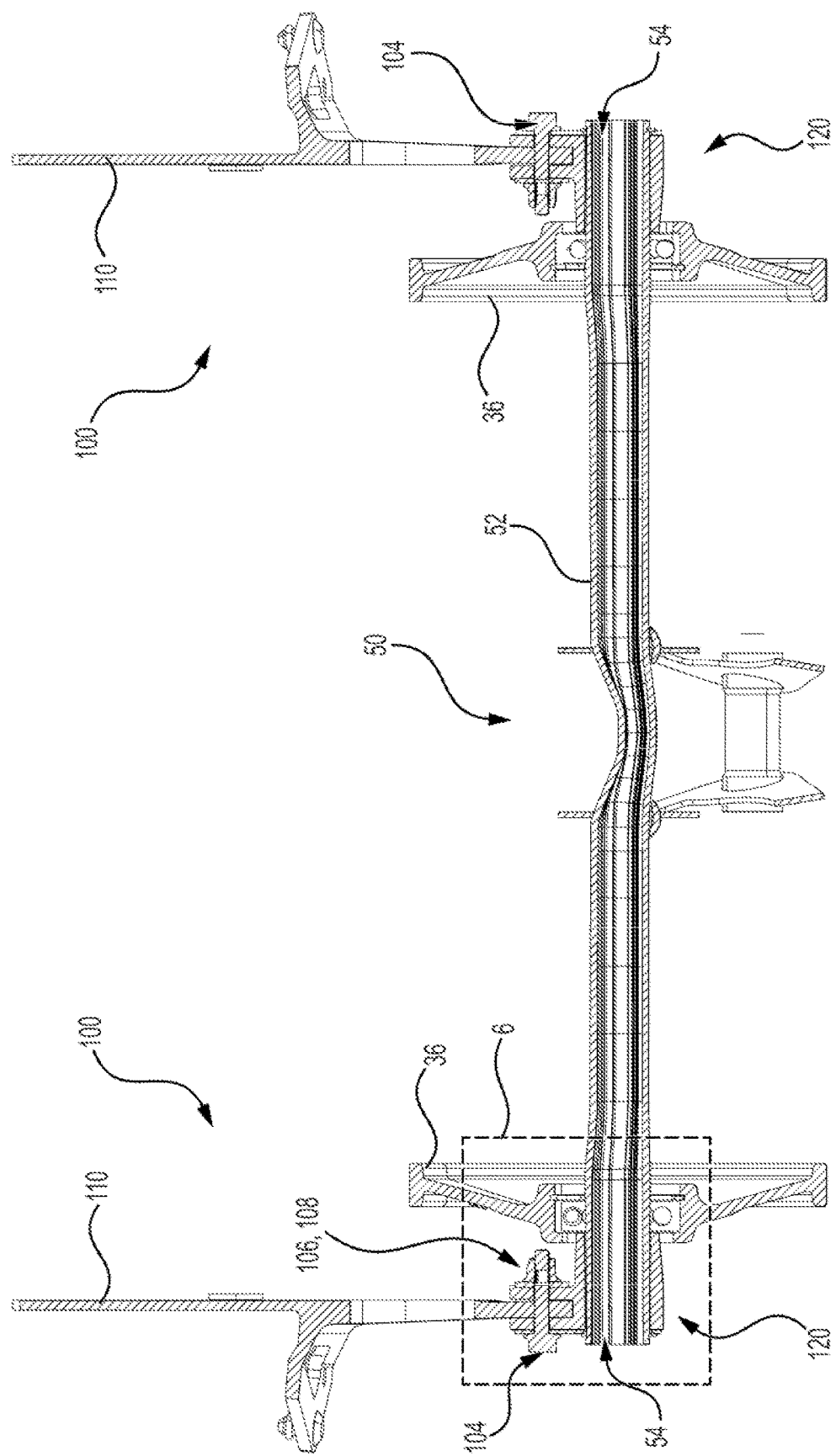
FIG. 5 is a cross-sectional view of the two support assemblies and portions of the rear suspension of FIG. 4, taken along line 5-5 of FIG. 4.
Figure 9:
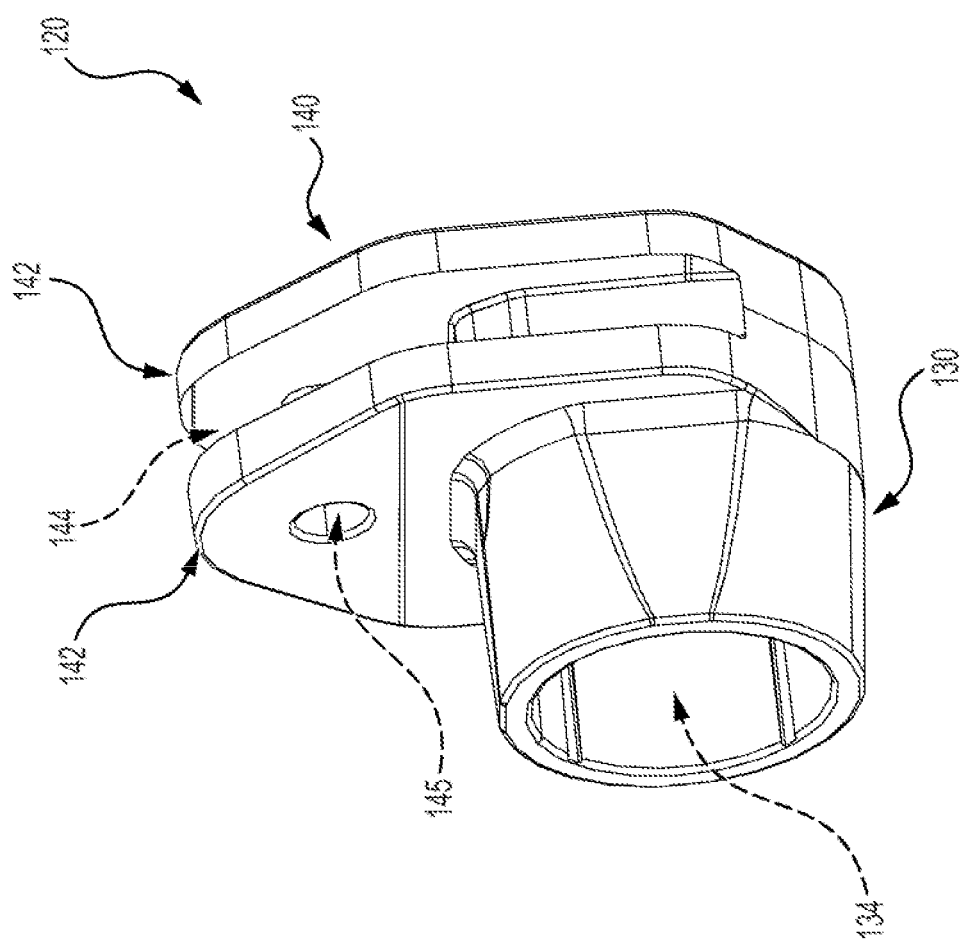
FIG. 9 is a front, right side perspective view of the connector of FIG. 8.
Figure 8:
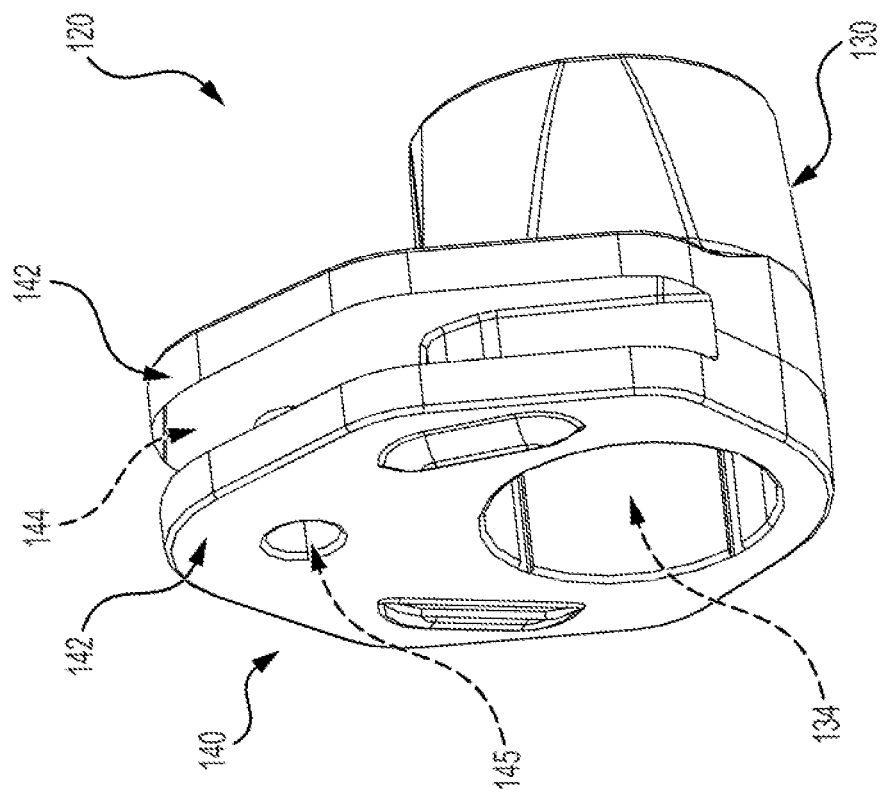
FIG. 8 is a rear, left side perspective view of a connector of the left support assembly of the snowmobile of FIG. 1.

The connector 120 is illustrated in isolation in FIGS. 8 and 9. The connector 120 is disposed on the end portion 54 of the top bar 52. The connector 120 includes an arm portion 130 forming the generally lower portion of the connector 120, as arranged in the assembly 100 as installed on the snowmobile 10. The arm portion 130 has a connector passage 134 defined therein. The end portion 54 extends through the connector passage 134, as can be seen in FIGS. 5 and 6. The connector passage 134 is sized and arranged to loosely fit around the end portion 54, permitting the top bar 52 to pivot freely within the connector 120.

The connector 120 further includes a flange portion 140 extending from the arm portion 130. The flange portion 140 extends generally upward from the arm portion 130, as arranged in the assembly 100 as installed on the snowmobile 10. The flange portion 140 includes two parallel flanges 142, each flange 142 also extending generally parallel to the bracket 110 when the assembly 100 is installed. Each flange 142 includes a through hole 145 defined therein for receiving the fastener 104 therethrough. The flanges 142 define therebetween a slot 144 in the flange portion 140. Use of the slot 144 is described in more detail below.

In the present embodiment, the arm portion 130 and the flange portion 140 are integrally connected. The connector 120 is formed from durable, light weight, low friction material, generally a thermoplastic material. In the present non-limiting example, the connector 120 is formed from acetal. In different embodiments, it is contemplated that different thermoplastics could be used to form the connector 120. By using a low friction connector 120, loosely fit around the top bar 52, no lubricant is generally required between the connector 120 and the top bar 52.

The assembly 100 further includes a clip 150 for aiding in maintaining the connector 120 in place on the bar 52. Generally, the clip 150 secures the connector 120 on the top bar 52. The clip 150 is connected to the end portion 54. The clip 150 is disposed outward of the connector 120. When the assembly 100 is installed on the snowmobile 10, the clip 150 is received in a groove 55 defined in the end portion 54. In the illustrated embodiment, the clip 150 is a c-clip 150. It is contemplated that different variations of clips 150 could be used, including but not limited to: cotter pins and other fasteners.

The assembly 100 further includes a plate 160 disposed between the connector 120 and the clip 150. In the illustrated embodiment, the plate 160 is fastened to the connector 120 by the fastener 104 when the assembly 100 is installed on the snowmobile 10. It is contemplated that the plate 160 could be differently connected to the connector 120 in some embodiments, for example by gluing the components 120, 160 together. In at least some embodiments, the plate 160 further serves to increase the head bearing surface for the fastener 104, acting as a washer under the head of the fastener 104.

The plate 160 has a plate body 162 formed from metal, specifically steel. It is contemplated that the plate body 162 could be formed from different rigid materials, including but not limited to: stainless steel and aluminum. It is also contemplated that the plate 160 could be omitted in some embodiments.

The plate 160 includes a plate passage 164 defined in the plate body 162. The plate passage 164 is sized and arranged to receive the end portion 54 therethrough, such that the plate 160 is disposed around the end portion 54 when installed on the snowmobile 10. The plate 160 also includes a through hole 166 for receiving the fastener 104 therethrough.

The plate 160 is sized and arranged such that a gap is formed between the plate passage 164 and the top bar 54 such that the plate 160 and the rear suspension arm 50 are not in direct contact. Specifically, the plate passage 164 has a larger diameter than the outer diameter of end portion 54 of the top bar 52. Rotation of the top bar 52 therefore does not incur any damage on the plate 160 or the top bar 54, since the two components 160, 54 are not in contact. While the connector passage 134 and the plate passage 164 are coaxial, the plate passage 164 also has a larger diameter than connector passage 134, such that the top bar 52 does not contact the plate 160 even when abutting sides of the connector passage 134.

With components of the assembly 100 set out above, the arrangement and use of the assembly 100 as installed on the snowmobile 10 will be described in additional detail.

As is mentioned above, the bracket 110 is fastened to the tunnel 18 and the connector 120 is disposed on the end portion 54 of the top bar 52 of the rear suspension arm 50. To link the bracket 110 and the connector 120, the bottom portion 116 of the bracket 110 is received in the slot 144 of the flange portion 140 of the connector 120. The bottom portion 116 of the bracket 110, and more specifically the members 117, extend partially around the arm portion 130 of the connector 120 such that the arm portion 130 is received in the recess 119 of the bracket 110. As can be seen in FIGS. 7 to 9, the recess 119 and the arm portion 130 generally aligned with the slot 144 are congruous but not circular. This arrangement aids in preventing the connector 120 from rotating relative to the bracket 110 when the arm 50 pivots.

The plate 160 is disposed outward of the connector 120 and the clip 150 is connected outward of the plate 160 and received in the groove 55. The fastener 104 then fastens the plate 160, the connector 120, and the bracket 110 together. As can be seen in FIG. 6, the fastener 104 extends through the through hole 166 of the plate 160, the through hole 145 of a first one of the flanges 142, the through hole 115 of the bracket 110, and the second one of the flanges 145, with the washer 106 and the nut 108 connected to the bolt 104 on an interior side of the assembled components.

The plate 160 extends around the end portion 54 and is fastened to the bracket 110, as mentioned above. In case of the connector 120 breaking, the plate 160 is arranged to maintain the connection of the top bar 52 with the bracket 110.

When the fastener 104 is tightened, the inward-most flange 142 is deflected at least partially inward, pressed into the undercut 113 of the bracket body 111 (not separately illustrated). FIG. 6 illustrates the inward-most flange 142 in an undeflected position. The undercut 113 of the bracket body 111 is arranged such that the bracket 110 bears the forces on the support assembly 100 from downward movement of the suspension arm 50 relative to the tunnel 18. The surface contacting between the undercut 113 and the flange 142 conducts the downward force therethrough, thereby limiting the downward forces on the fastener 104 when the connector 120 is pulled downward away from the bracket 110. When the top bar 54 is forced upward, upward forces are transmitted to the tunnel 18 through the connector 120 applying upward force through the arm portion 130 to the bottom portion 116 of the bracket 110, thereby limiting upward forces on the fastener 104.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A vehicle comprising:
a chassis;
at least one seat connected to the chassis;
a motor connected to the chassis;
an endless drive track disposed at least in part below the chassis, the endless drive track being operatively connected to the motor for propulsion of the vehicle;
a suspension assembly supporting the endless drive track, the suspension assembly comprising:
at least one slide rail,
at least one suspension arm pivotally connected to the at least one slide rail and pivotally connected to the chassis, the at least one suspension arm including a top bar extending laterally at least partially under the chassis, and
a shock absorber connected between the chassis and the at least one slide rail;
a first support assembly connecting a first end portion of the top bar of the at least one suspension arm to a first side of the chassis; and
a second support assembly connecting a second end portion of the top bar of the at least one suspension arm to a second side of the chassis, the second end portion being disposed laterally opposite the first end portion, each of the first support assembly and the second support assembly comprising:
a bracket connected to the chassis at a top portion of the bracket; and
a connector disposed on a corresponding one of the first end portion of the top bar and the second end portion of the top bar,
the connector including:
an arm portion with a connector passage defined therein, the corresponding one of the first end portion and the second end portion extending through the connector passage, and
a flange portion extending from the arm portion, the flange portion defining a slot therein,
a bottom portion of the bracket being received in the slot of the flange portion of the connector.

2. The vehicle of claim 1, wherein, for each of the first support assembly and the second support assembly, the bottom portion of the bracket extends at least partially around the arm portion of the connector.

3. The vehicle of claim 1, wherein each of the first support assembly and the second support assembly further comprises a clip connected to the corresponding one of the first end portion and the second end portion, the clip being disposed outward of the connector.

4. The vehicle of claim 1, wherein:
each of the first support assembly and the second support assembly further comprises a plate connected to the connector; and
for each of the first support assembly and the second support assembly:
the plate is fastened to the connector, and
the plate is further fastened to the bracket.

5. The vehicle of claim 4, wherein, for each of the first support assembly and the second support assembly:
the plate includes:
a plate body, and
a plate passage defined in the plate body; and
the plate is disposed around the corresponding one of the first end portion and the second end portion such that the top bar extends through the plate passage.

6. The vehicle of claim 5, wherein:
the plate is fastened to the connector and the bracket; and
the plate is arranged such that a gap is formed between the plate passage and the top bar such that the plate and the at least one suspension arm are not in direct contact.

7. The vehicle of claim 4, wherein, for each of the first support assembly and the second support assembly:
the connector is formed from a thermoplastic material; and
the plate is formed from metal.

8. The vehicle of claim 1, wherein, for each of the first support assembly and the second support assembly:
the bracket includes a bracket body;
the bracket body forms an undercut on at least one lateral side of the bracket body; and
at least one side of the flange portion is pressed into the undercut when the connector is fastened to the bracket.

9. The vehicle of claim 8, wherein, for each of the first support assembly and the second support assembly:
the undercut of the bracket body is arranged such that the bracket bears forces on the support assembly from downward movement of the at least one suspension arm relative to the chassis.

10. The vehicle of claim 1, wherein, for each of the first support assembly and the second support assembly, the arm portion of the connector and the flange portion of the connector are integrally connected.

11. A suspension system for supporting an endless drive train, the system comprising:
a suspension assembly comprising:
at least one slide rail;
at least one suspension arm pivotally connected to the at least one slide rail and configured to be pivotally connected to a chassis of a vehicle, the at least one suspension arm including a laterally extending top bar of the at least one suspension arm; and
a shock absorber connected to the at least one slide rail and configured to be connected to the chassis; and at least one support assembly for connecting an end portion of the top bar of the at least one suspension arm to the chassis, the support assembly comprising:
- a bracket configured for connecting to the chassis at a top portion of the bracket; and
- a connector disposed on the end portion of the top bar, the connector including:
  - an arm portion with a connector passage defined therethrough, the end portion extending through the connector passage, and
  - a flange portion extending from the arm portion, the flange portion defining a slot therein,
- a bottom portion of the bracket being received in the slot of the flange portion of the connector.

12. The suspension system of claim 11, wherein the support assembly further comprises a clip connected to the end portion, the clip being disposed outward of the connector.

13. The suspension system of claim 12, wherein the support assembly further comprises a plate disposed between the connector and the clip, the plate being connected to the connector.

14. The suspension system of claim 12, wherein the clip is a c-clip.

15. The suspension system of claim 11, wherein the support assembly further comprises a plate connected to the connector.

16. The suspension system of claim 15, wherein the plate is fastened to the connector.

17. The suspension system of claim 16, wherein the plate is further fastened to the bracket.

18. The suspension system of claim 15, wherein
the plate includes:
- a plate body, and
- a plate passage defined in the plate body; and the plate is disposed around the end portion such that the top bar extends through the plate passage.

19. The suspension system of claim 11, wherein the bottom portion of the bracket extends at least partially around the arm portion of the connector.

20. The suspension system of claim 11, wherein the arm portion of the connector and the flange portion of the connector are integrally connected.

* * * * *